Dec. 16, 1924.
C. S. FLOWERS
VALVE
Filed Sept. 16, 1921
1,519,446
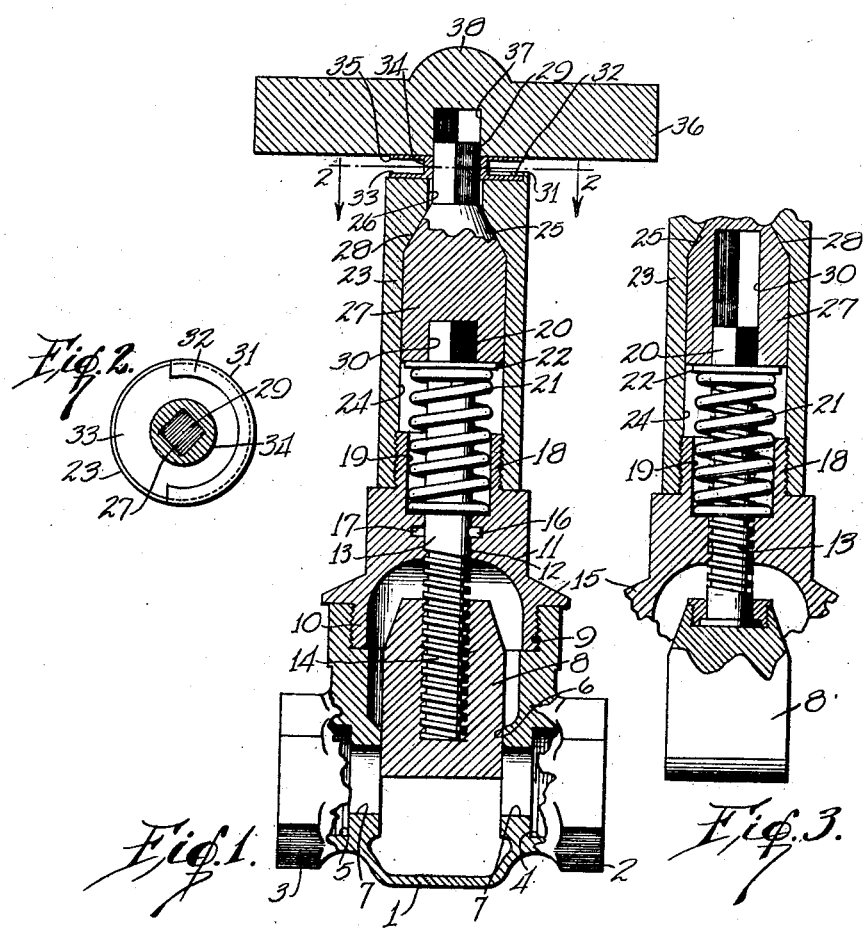
INVENTOR
C.S.Flowers
BY
ATTORNEYS Patented Dec. 16, 1924.

1,519,446

UNITED STATES PATENT OFFICE.

CHARLES S. FLOWERS, OF CHICAGO, ILLINOIS.

VALVE.

Application filed September 16, 1921. Serial No. 501,167.

*To all whom it may concern:*

Be it known that I, CHARLES S. FLOWERS, a citizen of the United States, and a resident of Chicago, in the county of Cook and State of Illinois, have invented a new and useful Improvement in Valves, of which the following is a full, clear, and exact description.

My invention relates to valves, and it consists in the combinations, constructions and arrangements herein described and claimed:

An object of my invention is to provide an attachment for a valve of an ordinary construction, having means co-acting with certain ordinary parts of the valve to prevent leakage about the valve stem without their being any necessity for providing the usual fibrous packing.

A further object of my invention is to provide an attachment of the character described that is adapted to be applied to a valve body of an ordinary construction without any change in the latter being required, whereby an all-metal valve is provided.

A further object of my invention is to provide a device of the character described having means adapted to engage with ordinary parts of a valve of a known type of construction to prevent the accidental displacement of the parts of the valve.

A further object of my invention is to provide a device of the character described in which the relatively moving parts will be automatically adjusted relatively to compensate for wear on such parts.

Other objects and advantages will appear in the following specification, and the novel features of the invention will be particularly pointed out in the appended claim.

My invention is illustrated in the accompanying drawings, forming part of this application, in which—

Fig. 1 is a central vertical section through a valve of a non-rising stem type of construction equipped with my invention, Fig. 2 is a section along the line 2—2 of Fig. 1, Fig. 3 is a view similar to Fig. 1 through a fragmentary portion of a valve of the rising stem type of construction.

Referring now particularly to Fig. 1, 1 denotes a valve body formed to provide an inlet 2 and an outlet 3. The inlet 2 and the outlet 3 are threaded interiorly, as at 4 and 5, respectively, for pipe connections. The body 1 has a vertical chamber 6 intersecting the bore 7 leading from the inlet 2 to the outlet 3 and in this chamber is slidably disposed a valve gate 8. The chamber is open at its upper end and is threaded at 9 for engagement with the threaded portion 10 of a cover or bonnet 11. The latter is fashioned with a central bore 12 in which a valve stem 13 is received. The bonnet 11 is arranged with a screw portion 14 thereof depending within the chamber 6 and engaging a threaded socket 15 in the valve gate 8. The portion of the stem 13 disposed within the bore 12 is equipped with a laterally extending projection 16 disposed within an annular groove 17 in the wall of the bore 12, whereby the stem 13 can be rotated, but will not move axially with respect to the bonnet 11.

The bonnet 11 has a vertically extending nipple portion 18, which is formed with a bore diametrically larger than the portion of the stem 13 projected therethrough, thereby providing an annular space 19 about the valve stem in which fibrous packing is disposed in a valve of an ordinary construction. The valve stem is non-circular in form at its upper end, as indicated at 20.

The parts described so far are ordinary in construction and form no part of my invention, except in so far as they cooperate with the parts which will now be described. Instead of the usual fibrous packing and the usual cap for the bonnet 11, I provide a spring 21 which is coiled about the upper portion of the valve stem 13 and is seated in the annular space or chamber 19. A bearing washer 22 is projected over the upper end of the valve stem and rests upon the spring 21. A sleeve casing 23 is fashioned with a relatively large bore 24 threaded interiorly adjacent to its lower end for engagement with the nipple portion 19. The bore 24 has a tapering portion 25 merging the relatively large portion thereof into a diametrically smaller portion 26 adjacent to the upper end thereof, thereby defining a tapering seat for an auxiliary stem member 27 which is fashioned adjacent to its upper end with a tapering portion 28 adapted to the tapered seat and integral with an axial extension 29 which projects beyond the end of the sleeve 23 and is non-circular in form, as shown. The auxiliary stem member 27 has a socket 30 in its lower end that is non-circular in section and is adapted to receive the non-circular upper end portion of the stem 13, whereby the spring 21 will exert a tension on the auxiliary stem member 27 that will hold the latter on its seat when the sleeve 23 is screwed on the nipple portion 18, as illustrated. The sleeve 23 is formed with an integral arcuate retaining flange 31 at its upper end having an inwardly extending portion 32 spaced from the upper end wall of the sleeve proper and adapted to overlie a flange 33 of a tubular connector 34. The latter has a flange 35 at its upper end secured by any suitable known means to the under side of a hand wheel 36 so that the bore of the tubular connector is in registry with a socket 37 adapted to receive the non-circular upper end portion 29. The hand wheel 36 is preferably formed with a central boss 38 on its upper side, whereby the height of the socket 37 may be increased to accommodate a portion 29 having a length greater than that of the socket in the hand wheel 36 as originally provided.

From the foregoing description of the various parts of the device, the operation thereof may be readily understood. In assembling the device, the hand wheel 36 is moved from the side of the sleeve 23 into engagement with the retaining flange 31. The auxiliary stem member 27 is then disposed within the sleeve 23 so that the portion 29 is received within the socket 37. The hand wheel 36 will then be locked on the sleeve 23 when the latter is screwed on the nipple portion 18. The action of the spring 21 on the auxiliary stem portion 27 will maintain the latter on its seat and thereby prevent the leakage of a fluid between the stem and the sleeve. It will be manifest that the operation of the hand wheel 36 will occasion a movement of the valve gate 8, whereby the flow of a fluid through the valve body 1 may be controlled in the usual manner. Since the auxiliary stem member 27 is under spring pressure at all times, it will be "ground in" its seat, and any wear resulting from the rotation of the auxiliary stem member will not detrimentally affect the engagement of the member 27 with its seat.

Referring now to Fig. 3, I show a valve of the rising stem type of construction equipped with my invention. The form of the device adapted for use with a rising stem valve is identical with the form which has just been described in all essential respects, and I shall therefore confine my description of the form of the device illustrated in Fig. 3 to the parts thereof that differ in construction from the same parts of the form of the device which have been described. Like reference numerals have been applied to corresponding parts throughout. In the form of the device illustrated in Fig. 3, the auxiliary stem member 27 is fashioned with a socket 30 having a length considerably greater than that of the non-circular portion 20 of the valve stem 13 received therein when the valve gate 8 is in its lowermost or closed position, whereby the valve stem 13 is permitted to move upwardly when the hand wheel is manipulated to occasion a movement of the valve gate 8 into open position. The stem 13 and the valve gate 8 are cooperatively formed in any suitable known manner to insure a rotation of the valve stem 13 relatively to the gate 8 and a movement of the valve stem axially when the hand wheel is manipulated.

Since the valve equipped with my invention is formed entirely of metal, it is obvious that such a valve will last longer in service without the replacing of any parts thereof than is possible when an ordinary valve is employed in a like service.

It is to be observed that the valve body 1 and the cover or bonnet 11 together form the valve casing and that the words "valve casing" as used in the appended claim are intended to define all essential parts of a valve of a known type of construction with the exception of the gate and stem.

I claim:

A valve comprising a body portion, a valve actuating screw projecting above said body portion, a sleeve having a threaded connection with said body portion, said sleeve having a bore with a reduced tapered portion, an auxiliary cylindrical shaped stem rotatably disposed in said bore and having a conical-shaped portion and a non-circular portion, a spring for yieldingly holding the conical-shaped portion of said auxiliary stem in engagement with the tapered portion of said sleeve, an actuating handle having a non-circular bore adapted to receive the non-circular portion of said auxiliary stem, a flange carried by said sleeve, and a flange carried by said handle adapted to engage with the flange on said sleeve to operatively connect the handle to said auxiliary stem, said spring also keeping the non-circular portion of said auxiliary stem in the bore of said handle, whereby said handle is prevented from lateral movement with respect to said sleeve and is locked to said sleeve.

CHARLES S. FLOWERS.